(12) United States Patent
He et al.

(10) Patent No.: US 11,662,792 B1
(45) Date of Patent: May 30, 2023

(54) DETERMINING UTILIZATION OF A COMPUTING COMPONENT

(71) Applicant: Dell Products L.P., Round Rock, TX (US)

(72) Inventors: Qinghong He, Austin, TX (US); Balasingh P Samuel, Round Rock, TX (US); Travis C. North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/648,693

(22) Filed: Jan. 24, 2022

(51) Int. Cl.
  *G06F 1/20* (2006.01)
  *G06F 1/28* (2006.01)
  *G06F 9/48* (2006.01)

(52) U.S. Cl.
  CPC ............... *G06F 1/28* (2013.01); *G06F 1/206* (2013.01); *G06F 9/4893* (2013.01)

(58) Field of Classification Search
  CPC .......... G06F 1/206; G06F 1/28; G06F 9/4893
  See application file for complete search history.

(56) References Cited

U.S. PATENT DOCUMENTS

| | | | | |
|---|---|---|---|---|
| 10,346,239 | B1 * | 7/2019 | Ortega Gutierrez | ........................ G06F 11/0754 |
| 2007/0067657 | A1 * | 3/2007 | Ranganathan | .......... G06F 1/206 713/320 |
| 2012/0079480 | A1 * | 3/2012 | Liu | .......... H04L 47/70 718/1 |
| 2015/0323972 | A1 * | 11/2015 | Gotheil-Yelle | ....... G06F 11/079 713/340 |
| 2019/0041951 | A1 * | 2/2019 | Shapira | ................. G06F 1/3206 |

\* cited by examiner

*Primary Examiner* — Mark A Connolly
(74) *Attorney, Agent, or Firm* — McDermott Will & Emery LLP (57) ABSTRACT

Determining utilization of a computing component, including: determining, of the power limits of the respective registers, a lowest power limit; determining an instantaneous power use of the computing component; determining a power-based utilization of the computing component based on i) the instantaneous power use of the computing component and ii) the lowest power limit indicated by the registers; identifying an instantaneous temperature and temperature limit of the computing component, and an ambient temperature of an environment of the computing component; determining a temperature-based utilization of the computing component based on the instantaneous temperature and the temperature limit of the computing component, and the ambient temperature of the environment; determining the utilization of the computing component based on a greater of the power-based utilization of the computing component and the temperature-based utilization of the computing component, and in response, adjusting execution of computer-implemented actions performed at the computing component.

20 Claims, 3 Drawing Sheets

DETERMINING UTILIZATION OF A COMPUTING COMPONENT

BACKGROUND

Field of the Disclosure

The disclosure relates generally to an information handling system, and in particular, determining utilization of a computing component.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Users often the check task manager and processor (CPU) utilization percentage when using their information handling systems. However, this utilization percentage can be inaccurate against system capacity of the information handling system.

SUMMARY

Innovative aspects of the subject matter described in this specification may be embodied in a method of determining utilization of a computing component, including identifying, for each register of a plurality of registers, a respective power limit indicated by the register; determining, of the power limits of the respective registers, a lowest power limit; determining an instantaneous power use of the computing component; determining a power-based utilization of the computing component based on i) the instantaneous power use of the computing component and ii) the lowest power limit indicated by the registers; identifying i) an instantaneous temperature of the computing component, ii) a temperature limit of the computing component, and iii) an ambient temperature of an environment of the computing component; determining a temperature-based utilization of the computing component based on i) the instantaneous temperature of the computing component, ii) the temperature limit of the computing component, and iii) the ambient temperature of an environment of the computing component; determining the utilization of the computing component based on a greater of the power-based utilization of the computing component and the temperature-based utilization of the computing component; and in response to determining the utilization of the computing component, adjusting execution of one or more computer-implemented actions performed at the computing component.

Other embodiments of these aspects include corresponding systems, apparatus, and computer programs, configured to perform the actions of the methods, encoded on computer storage devices.

These and other embodiments may each optionally include one or more of the following features. For instance, comparing the instantaneous power of the computing component with the lowest power limit indicated by the registers; and determining, based on the comparing, that the instantaneous power of the computing component is greater than the lowest power limit indicated by the registers, and in response, assigning a value of the lowest power limit indicated by the registers as the instantaneous power of the computing component. Comparing the instantaneous power of the computing component with the lowest power limit indicated by the registers; and determining, based on the comparing, that the instantaneous power of the computing component is less than the lowest power limit indicated by the registers, and in response, determining the power-based utilization of the computing component based on i) the instantaneous power use of the computing component and ii) the lowest power limit indicated by the registers. Determining the power-based utilization of the computing component further comprises: determining a ratio of the instantaneous power use of the computing component to the lowest power limit indicated by the registers; and determining the power-based utilization of the computing component as the ratio of the instantaneous power use of the computing component to the lowest power limit indicated by the registers. The plurality of registers include a model-specific register, a memory-mapped input/output (MMIO) register, and a platform environment control interface (PECI) register. The temperature-based utilization of the computing component is further based on a user-provided value, wherein determining the temperature-based utilization of the computing component further comprises: determining a first difference between the instantaneous temperature of the computing component and the ambient temperature of the environment of the computing component; determining a second difference between the temperature limit of the computing component and the user-provided value; determining a third difference between the second difference and the ambient temperature of the environment of the computing component; determining a ratio of the first difference and the third difference; and determining the temperature-based utilization of the computing component as the ratio. Adjusting execution of one or more computer-implemented actions performed at the computing component includes providing a notification indicating to cease execution of one or more computer-implemented applications. Adjusting execution of one or more computer-implemented actions performed at the computing component includes adjusting a fan speed of a fan that cools the computing component.

Particular implementations of the subject matter described in this specification can be implemented so as to realize one or more of the following advantages. For example, a more accurate percentage of computing workload is provided whether the information handling system is skin limited, power limited, or component temperature limited.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for determining utilization of a computing component of an information handling system. In short, a power-based utilization of the computing component (based on a real-time power level of the allowed power limit at a given time) can be calculated; and a temperate-based utilization of the computing component (based on a real-time computing component temperature relative to the temperature limit at a given time) can be calculated. The power-based utilization and the temperature-based utilization can be compared and the utilization of the computing component is determined as the higher of the power-based utilization and the temperature-based utilization.

Specifically, this disclosure discusses a system and a method for determining utilization of a computing component, including identifying, for each register of a plurality of registers, a respective power limit indicated by the register; determining, of the power limits of the respective registers, a lowest power limit; determining an instantaneous power use of the computing component; determining a power-based utilization of the computing component based on i) the instantaneous power use of the computing component and ii) the lowest power limit indicated by the registers; identifying i) an instantaneous temperature of the computing component, ii) a temperature limit of the computing component, and iii) an ambient temperature of an environment of the computing component; determining a temperature-based utilization of the computing component based on i) the instantaneous temperature of the computing component, ii) the temperature limit of the computing component, and iii) the ambient temperature of an environment of the computing component; determining the utilization of the computing component based on a greater of the power-based utilization of the computing component and the temperature-based utilization of the computing component; and in response to determining the utilization of the computing component, adjusting execution of one or more computer-implemented actions performed at the computing component.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
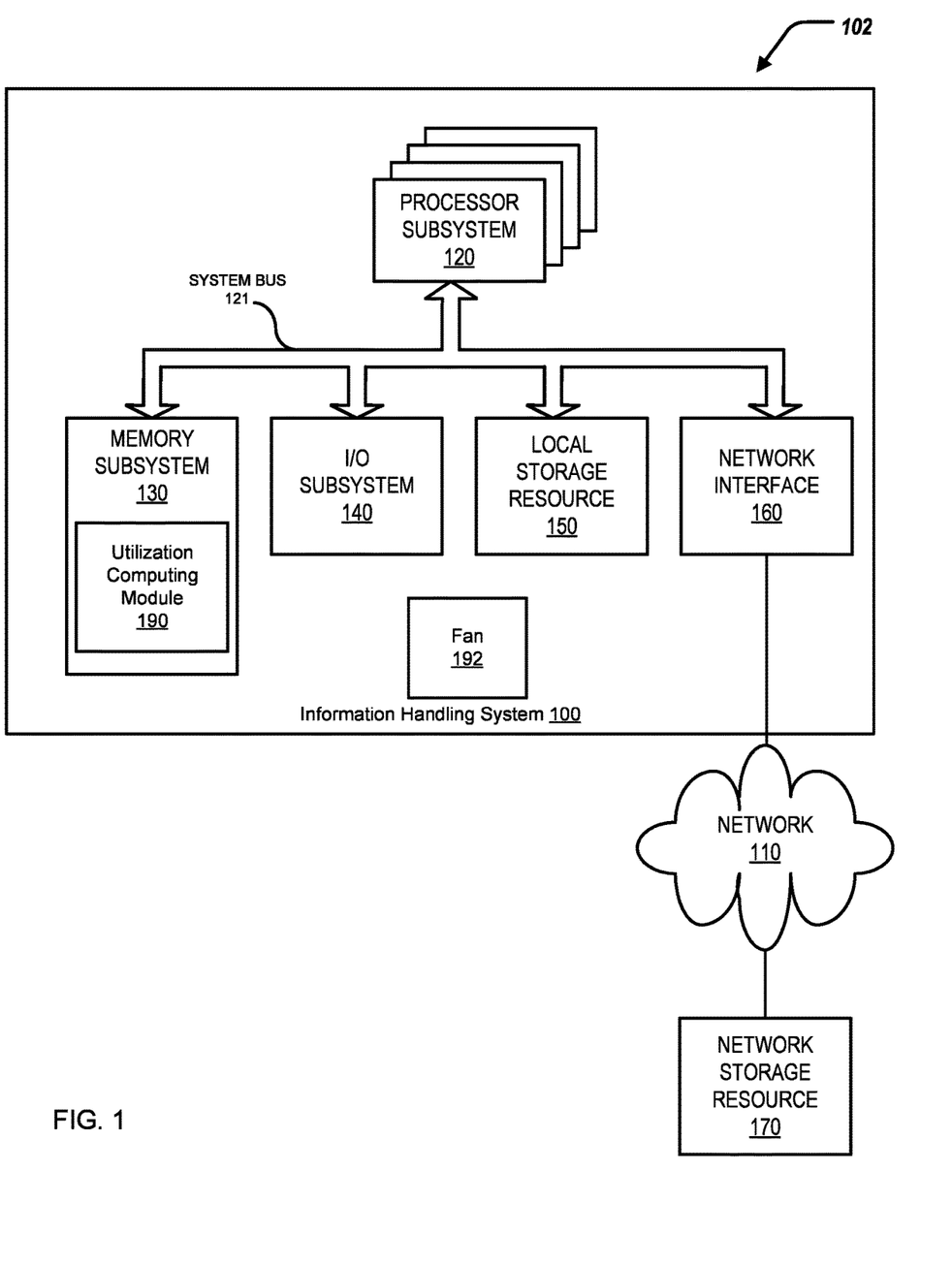
FIG. 1 is a block diagram of selected elements of an embodiment of an information handling system.
Figure 2:
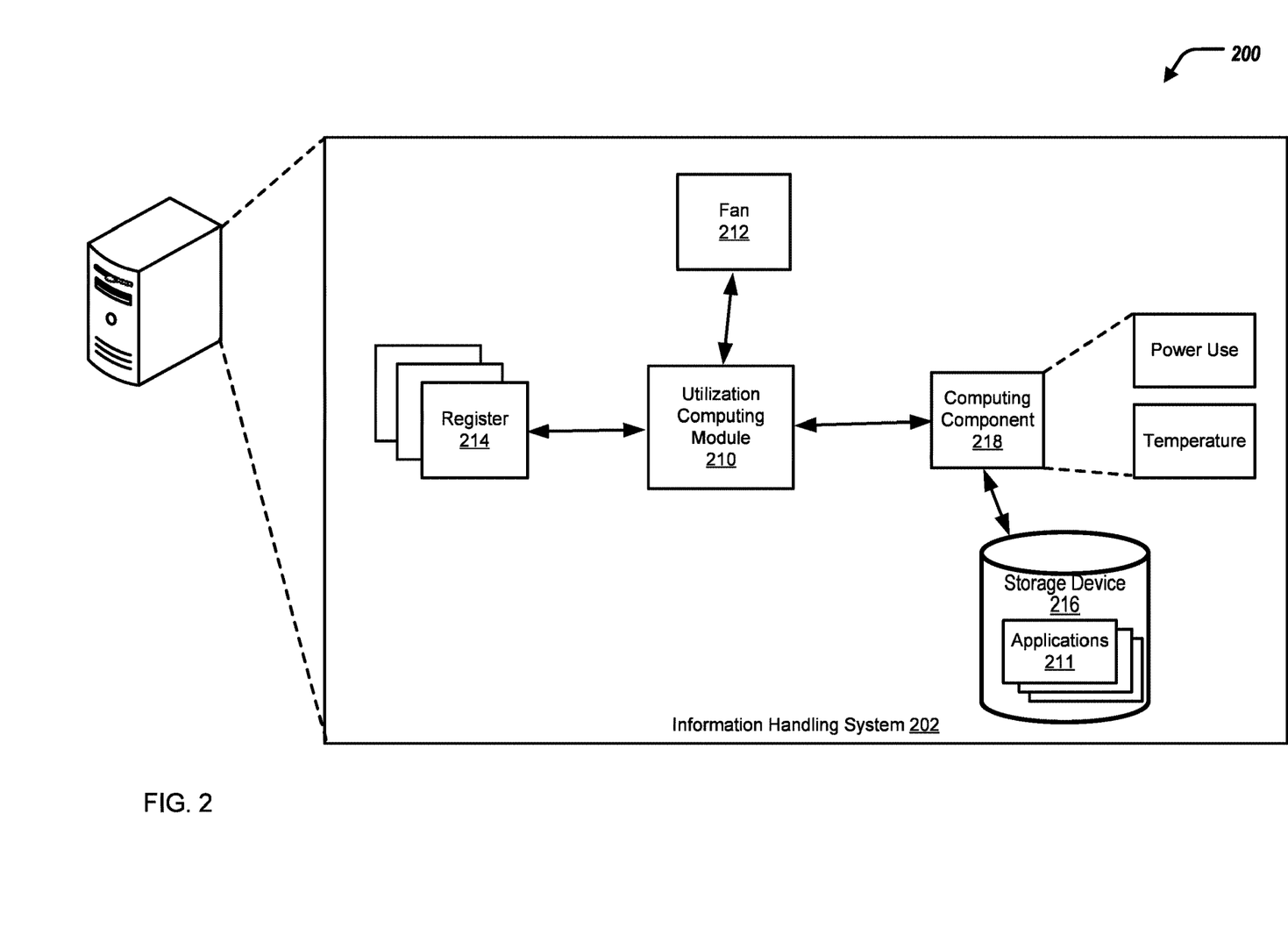
FIG. 2 illustrates a block diagram of an information handling system for determining utilization of a computing component.
Figure 3:
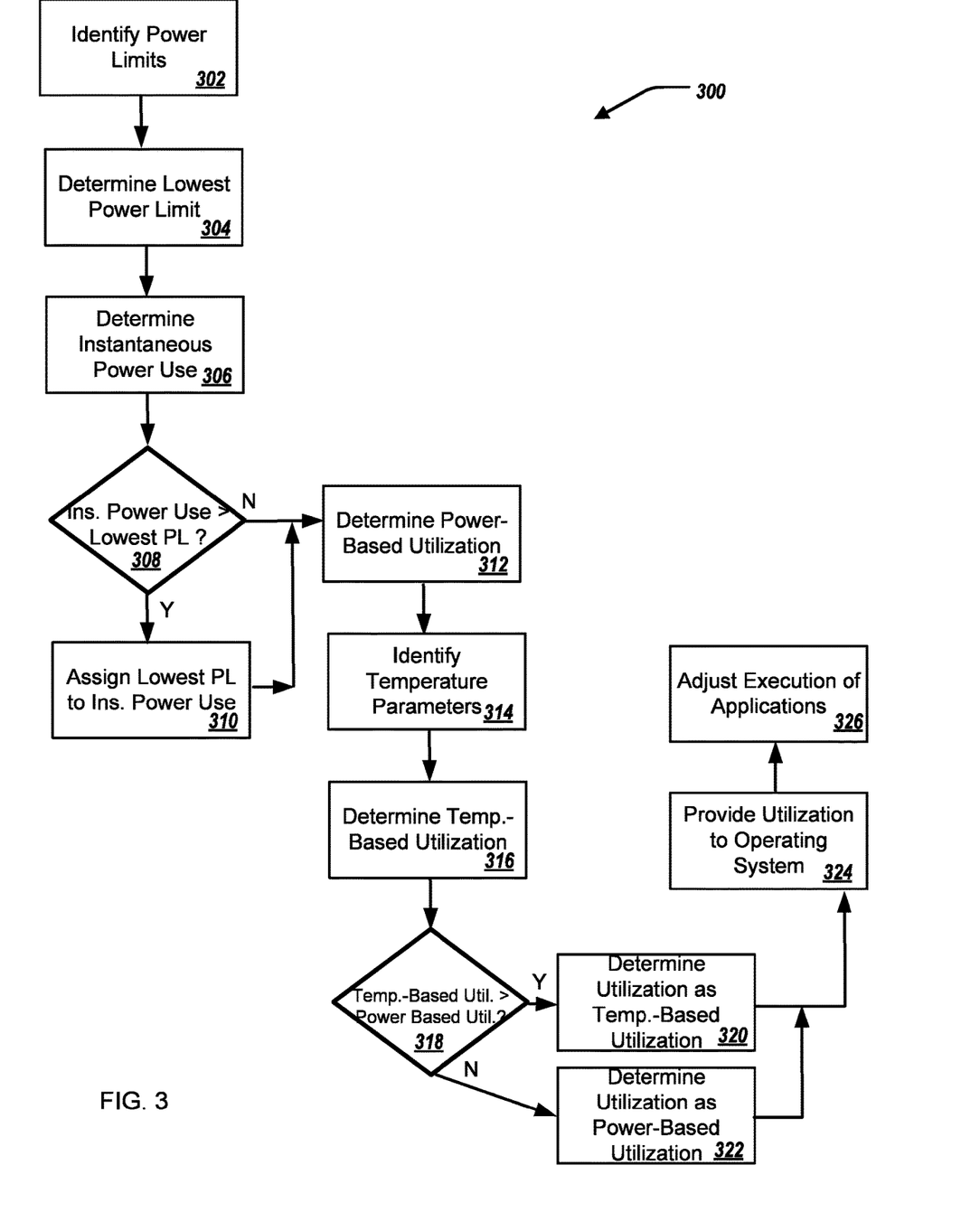
FIG. 3 illustrates a method for determining utilization of a computing component.

Particular embodiments are best understood by reference to FIGS. 1-3 wherein like numbers are used to indicate like and corresponding parts.

Turning now to the drawings, FIG. 1 illustrates a block diagram depicting selected elements of a computing environment 102 including an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

The information handling system 100 can further include a fan 192 to provide cooling to components of the information handling system 100.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a utilization computing module 190. The utilization computing module 190 can be included by the memory subsystem 130. The utilization computing module 190 can include a computer-executable program (software). The utilization computing module 190 can be executed by the processor subsystem 120.

In short, the utilization computing module 190 can determine a utilization of a computing component of the information handling system 102. That is, the utilization computing module 190 can calculate a power-based utilization of the computing component (based on a real-time power level of the allowed power limit at a given time); and further calculate a temperate-based utilization of the computing component (based on a real-time computing component temperature relative to the temperature limit at a given time). The utilization computing module 190 can compare the power-based utilization and the temperature-based utilization and determine the utilization of the computing component as the higher of the power-based utilization and the temperature-based utilization.

Turning to FIG. 2, FIG. 2 illustrates an environment 200 including an information handling system 202. The information handling system 202 can include a utilization computing module 210, a fan 212, registers 214, a storage device 216, and a computing component 218. In some examples, the information handling system 202 is similar to, or includes, the information handling system 100 of FIG. 1. In some examples, the utilization computing module 210 is the same, or substantially the same, as the utilization computing module 190 of FIG. 1. In some examples, the fan 212 is the same, or substantially the same, as the fan 192 of FIG. 1.

The utilization computing module 210 can be in communication with the fan 212, the registers 214, and the computing component 218. The computing component 218 can be in communication with the storage device 216.

In some examples, the registers 214 can include a model-specific register (MSR) that is maintained/set by the basic input/output system (BIOS) of the information handling system 202. In some examples, the registers 214 can include a memory-mapped input/output (MMIO) register that is maintained/set by an operating system (OS) driver of the information handling system 202. In some examples, the registers can 214 can include a platform environmental control interface (PECI) register that is maintained/set by an enclosure controller (EC) of the information handling system 202.

In some examples, the computing component 218 can include a graphical processer unit (GPU), a wide wireless access network (WWAN) component, a solid-state drive (SSD), or similar.

FIG. 3 illustrates a flowchart depicting selected elements of an embodiment of a method 300 for determining utilization of the computing component 218. The method 300 may be performed by the information handling system 100, the information handling system 202 and/or the utilization computing module 210, and with reference to FIGS. 1-2. It is noted that certain operations described in method 300 may be optional or may be rearranged in different embodiments.

The utilization computing module 210 can identify, for each register 214 of the registers 214, a respective power limit indicated by the register 214, at 302. That is, each of the MSR register, the MMIO register, and the PECI register can indicate a respective power limit. The power limit indicated by each of the MSR register, the MMIO register, and the PECI register can be associated with differing power limits. For example, the MMIO register can be controlled by dynamic tuning technology (DTT), and in some cases, has the smallest value. For example, the PECI register can indicate a smallest value of the power limit when a low-capacity power adapter is being used by the information handling system 202.

The power limits indicated by the respective registers 214 can dynamically change to represent a true power capacity at any given moment (instantaneously) that the power of the information handling system 202 can not exceed for a sustained workload.

The utilization computing module 210 can determine, of the power limits indicated by the registers 214, a lowest power limit, at 304. That is, the utilization computing module 210 compares the power limits indicated by each of the registers 214, and based on the comparison, determine the lowest power limit indicated by the registers 214.

The utilization computing module 210 can determine an instantaneous power use of the computing component 218, at 306. The utilization computing module 210 can compare the instantaneous power use of the computing component 218 with the lowest power limit indicated by the registers 214, at 308. In some examples, the utilization computing module 210 can determine, based on the comparing, that the instantaneous power of the computing component 218 is greater than the lowest power limit indicated by the registers 308, and in response, assign a value of the lowest power limit indicated by the registers 214 as the instantaneous power use of the computing component 218, at 310. For example, during over-overclocked usage of computing component 218 (e.g., a central processing unit (CPU)), or "turbo mode," the instantaneous power of the computing component 218 can exceed the power limits indicated by the registers 214. During such brief period, the instantaneous power can be capped to 100%, or the lowest power limit indicated by the registers 214.

In some examples, the utilization computing module 210 can determine, based on the comparing, that the instantaneous power of the computing component 218 is less than the lowest power limit indicated by the registers 308, and in response, determine a power-based utilization of the computing component 218, at 312. That is, the utilization computing module 210 can determine the power-based utilization of the computing component 214 based on the i) the instantaneous power use of the computing component 218 and ii) the lowest power limit indicated by the registers 214.

In some examples, determining the power-based utilization of the component 218 can include, determining, by the utilization computing module 210, a ratio of the instantaneous power use of the computing component 218 to the lowest power limit indicated by the registers 214. That is, the utilization computing module 210 can determine the power-based utilization of the computing component 218 based on the equation:

$$\text{power-based utilization(of the computing component 218)} = \text{instantaneous power use (of the computing component 218)/lowest power limit(indicated by the registers 214)} \quad (1).$$

The utilization computing module 210 can determine the power-based utilization of the computing component 218 as the ratio of the instantaneous power use of the computing component 218 to the lowest power limit indicated by the registers 214 (e.g., equation (1)).

In some examples, after assigning the value of the lowest power limit indicated by the registers 214 as the instantaneous power use of the computing component 218 (at 310), the method can proceed to step 312, including determining the power-based utilization of the computing component 214 based on the i) the instantaneous power use of the computing component 218 and ii) the lowest power limit indicated by the registers 214.

The utilization computing module 210 can identify temperature parameters of the computing component 218 and the information handling system 202, at 314. Specifically, the utilization computing module 210 can identify i) an instantaneous temperature of the computing component 218, ii) a temperature limit of the computing component 218, and iii) an ambient temperature of an environment of the computing component 218. For example, the temperature limit of the computing component 218, when the computing component 218 is a processor, is 100 Celsius. The ambient temperature of the environment of the computing component 218 can be a system ambient temperature of the information handling system 202 (i.e., received from an ambient sensor reading of the enclosure controller (EC)). In some examples, the utilization computing module 210 can further identify a user-provided value. The user-provided value (TCC) is a value that can be provided (e.g., by a user of the information handling system 202) to lower the temperature limit of the computing component 218. For example, when the temperature limit of the computing component 218 is 100 Celsius, the user provided value can be 3 Celsius, lowering the temperature limit of the computing component to 97 Celsius.

The utilization computing module 210 can determine a temperature-based utilization of the computing component 214 based on i) the instantaneous temperature of the computing component 218, ii) the temperature limit of the computing component 218, and iii) the ambient temperature of the environment of the computing component 218, at 316. In some examples, the utilization computing module 210 can determine a temperature-based utilization of the computing component 214 based on i) the instantaneous temperature of the computing component 218, ii) the temperature limit of the computing component 218, iii) the ambient temperature of the environment of the computing component 218, and iv) the user-provided value. That is, the utilization computing module 210 can determine a first difference between the instantaneous temperature of the computing component 218 and the ambient temperature of the environment of the computing component 218. That is, the utilization computing module 210 can determine the first difference based on the equation:

first difference=instantaneous temperature(of the computing component 218)−ambient temperature(of the environment of the computing component 218)    (2).

The utilization computing module 210 can determine a second difference between the temperature limit of the computing component 218 and the user-provided value. That is, the utilization computing module 210 can determining the second difference based on the equation:

second difference=temperature limit(of the computing component 218)−user-provided value    (3).

The utilization computing module 210 can determine a third difference between the second difference and the ambient temperature of the environment of the computing component 218. That is, the utilization computing module 210 can determine the third difference based on the equation:

third difference=second difference−ambient temperature(of the environment of the computing component 218)    (4).

The utilization computing module 210 can determine a ratio of the first difference and the third difference. That is, the utilization computing module 210 can determine the temperature-based utilization of the computing component 218 based on the equation:

temperature-based utilization(of the computing component 218)=first difference/third difference    (5).

The utilization computing module 210 can determine the temperature-based utilization of the computing component 218 as the ratio of the of the first difference to the third difference (e.g., equation (5)).

In other words, the utilization computing module 210 can determine the temperature-based utilization of the computing component 218 based on the equation:

temperature-based utilization(of the computing component 218)=[instantaneous temperature(of the computing component 218)−ambient temperature(of the environment of the computing component 218)]/[temperature limit(of the computing component 218)−user-provided value−ambient temperature(of the environment of the computing component 218)]    (6)

Similarly, the utilization computing module 210 can determine the temperature-based utilization of the computing component 218 based on equation (6).

The utilization computing module 210 can determine the utilization of the computing component 218 based on a greater of the power-based utilization of the computing component 218 and the temperature-based utilization of the computing component 218. That is, the utilization computing module 210 can compare the power-based utilization of the computing component 218 with the temperature-based utilization of the computing component 218, at 318. In some examples, the utilization computing module 210 can determine, based on the comparing, that the temperature-based utilization of the computing component 218 is greater than the power-based utilization of the computing component 218, and in response, assign the utilization of the computing component 218 as the temperature-based utilization of the computing component 218, at 320. In some examples, the utilization computing module 210 can determine, based on the comparing, that the temperature-based utilization of the computing component 218 is less than the power-based utilization of the computing component 218, and in response, assign the utilization of the computing component 218 as the power-based utilization of the computing component 218, at 322.

The utilization computing module 210, in response to determining the utilization of the computing component 218, can provide data/metrics indicating the utilization of the computing component 218 to an operating system of the information handling system 202, at 324.

Furthermore, the utilization computing module 210, in response to determining the utilization of the computing component 218, can adjust execution of one or more computer-implemented applications 211 (stored by the storage device 216) performed at the computing component 218, at 326. For example, the utilization computing module 210 can provide a notification (e.g., to a display device of the information handling system 202) indicating to cease execution of one or more of the computer-implemented applications 211 (e.g., to lower utilization of the computing component 218). For example, the utilization computing module 210 can adjust a fan speed of the fan 212 that cools the computing component (e.g., to increase or decrease the fan speed of the fan 212 based on the utilization).

In a first use case example, the instantaneous power of the computing component 218 can be 15 Watts, a MMIO register can indicate a power limit of 15 Watts, and a PECI register can indicate a power limit of 45 Watts. The utilization computing module 210 can determine the power-based utilization of the computing component 218 as 100% based on equation 1 (i.e., 15 Watts/15 Watts=100% power-based utilization). Further, the temperature limit of the computing component 218 can be 67 Celsius, the temperature limit of the computing component 218 can be 100 Celsius, the ambient temperature of the environment of the computing component 218 can be 25 Celsius, and the user-provided value is 3 Celsius. The utilization computing module 210 can determine the temperature-based utilization of the computing component 218 as 58.3% based on equations 2-5 or 6 (i.e., (67−25)/(100−3−25)=58.3% temperature-based utilization). The utilization computing module 210 can determine the utilization of the computing component 218 based on a greater of the power-based utilization of the computing component 218 (100%) and the temperature-based utilization of the computing component 218 (58.3%). That is, the utilization computing module 210 can determine the utilization of the computing component 218 as 100%.

In a second use case example, the instantaneous power of the computing component 218 can be 25 Watts, a MMIO register can indicate a power limit of 45 Watts, and a PECI register can indicate a power limit of 60 Watts. The utilization computing module 210 can determine the power-based utilization of the computing component 218 as 55% based on equation 1 (i.e., 25 Watts/45 Watts=55% power-based utilization). Further, the temperature limit of the computing component 218 can be 100 Celsius, the temperature limit of the computing component 218 can be 100 Celsius, the ambient temperature of the environment of the computing component 218 can be 25 Celsius, and the user-provided value is 0 Celsius. The utilization computing module 210 can determine the temperature-based utilization of the computing component 218 as 100% based on equations 2-5 or 6 (i.e., (100−25)/(100−0−25)=100% temperature-based utilization). The utilization computing module 210 can determine the utilization of the computing component 218 based on a greater of the power-based utilization of the computing component 218 (55%) and the temperature-based utilization of the computing component 218 (100%). That is, the utilization computing module 210 can determine the utilization of the computing component 218 as 100%.

In a third use case example, the instantaneous power of the computing component 218 can be 20 Watts, a MMIO register can indicate a power limit of 45 Watts, and a PECI register can indicate a power limit of 20 Watts. The utilization computing module 210 can determine the power-based utilization of the computing component 218 as 100% based on equation 1 (i.e., 20 Watts/20 Watts=55% power-based utilization). Further, the temperature limit of the computing component 218 can be 67 Celsius, the temperature limit of the computing component 218 can be 100 Celsius, the ambient temperature of the environment of the computing component 218 can be 25 Celsius, and the user-provided value is 3 Celsius. The utilization computing module 210 can determine the temperature-based utilization of the computing component 218 as 58.3% based on equations 2-5 or 6 (i.e., (67−25)/(100−3−25)=58.3% temperature-based utilization). The utilization computing module 210 can determine the utilization of the computing component 218 based on a greater of the power-based utilization of the computing component 218 (100%) and the temperature-based utilization of the computing component 218 (58.3%). That is, the utilization computing module 210 can determine the utilization of the computing component 218 as 100%.

In a fourth use case example, the instantaneous power of the computing component 218 can be 33.1 Watts, a MMIO register can indicate a power limit of 45 Watts, and a PECI register can indicate a power limit of 110 Watts. The utilization computing module 210 can determine the power-based utilization of the computing component 218 as 73.6% based on equation 1 (i.e., 33.1 Watts/45 Watts=73.6% power-based utilization). Further, the temperature limit of the computing component 218 can be 85 Celsius, the temperature limit of the computing component 218 can be 100 Celsius, the ambient temperature of the environment of the computing component 218 can be 25 Celsius, and the user-provided value is 0 Celsius. The utilization computing module 210 can determine the temperature-based utilization of the computing component 218 as 80% based on equations 2-5 or 6 (i.e., (85−25)/(100−0−25)=80% temperature-based utilization). The utilization computing module 210 can determine the utilization of the computing component 218 based on a greater of the power-based utilization of the computing component 218 (73.6%) and the temperature-based utilization of the computing component 218 (80%). That is, the utilization computing module 210 can determine the utilization of the computing component 218 as 80%.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:
1. A computer-implemented method of determining utilization of a computing component, the method comprising:
   identifying, for each register of a plurality of registers, a respective power limit indicated by the register;
   determining, of the power limits of the respective registers, a lowest power limit;
   determining an instantaneous power use of the computing component;
   determining a power-based utilization of the computing component based on i) the instantaneous power use of the computing component and ii) the lowest power limit indicated by the registers;
   identifying i) an instantaneous temperature of the computing component, ii) a temperature limit of the computing component, and iii) an ambient temperature of an environment of the computing component;
   determining a temperature-based utilization of the computing component based on i) the instantaneous temperature of the computing component, ii) the temperature limit of the computing component, and iii) the ambient temperature of an environment of the computing component;
   determining the utilization of the computing component based on a greater of the power-based utilization of the computing component and the temperature-based utilization of the computing component; and in response to determining the utilization of the computing component, adjusting execution of one or more computer-implemented actions performed at the computing component.

2. The computer-implemented method of claim 1, further comprising:
comparing the instantaneous power of the computing component with the lowest power limit indicated by the registers; and
determining, based on the comparing, that the instantaneous power of the computing component is greater than the lowest power limit indicated by the registers, and in response, assigning a value of the lowest power limit indicated by the registers as the instantaneous power of the computing component.

3. The computer-implemented method of claim 1, further comprising:
comparing the instantaneous power of the computing component with the lowest power limit indicated by the registers; and
determining, based on the comparing, that the instantaneous power of the computing component is less than the lowest power limit indicated by the registers, and in response, determining the power-based utilization of the computing component based on i) the instantaneous power use of the computing component and ii) the lowest power limit indicated by the registers.

4. The computer-implemented method of claim 1, wherein determining the power-based utilization of the computing component further comprises:
determining a ratio of the instantaneous power use of the computing component to the lowest power limit indicated by the registers; and
determining the power-based utilization of the computing component as the ratio of the instantaneous power use of the computing component to the lowest power limit indicated by the registers.

5. The computer-implemented method of claim 1, wherein the plurality of registers include a model-specific register, a memory-mapped input/output (MMIO) register, and a platform environment control interface (PECI) register.

6. The computer-implemented method of claim 1, wherein the temperature-based utilization of the computing component is further based on a user-provided value, wherein determining the temperature-based utilization of the computing component further comprises:
determining a first difference between the instantaneous temperature of the computing component and the ambient temperature of the environment of the computing component;
determining a second difference between the temperature limit of the computing component and the user-provided value;
determining a third difference between the second difference and the ambient temperature of the environment of the computing component;
determining a ratio of the first difference and the third difference; and
determining the temperature-based utilization of the computing component as the ratio.

7. The computer-implemented method of claim 1, wherein adjusting execution of one or more computer-implemented actions performed at the computing component includes providing a notification indicating to cease execution of one or more computer-implemented applications.

8. The computer-implemented method of claim 1, wherein adjusting execution of one or more computer-implemented actions performed at the computing component includes adjusting a fan speed of a fan that cools the computing component.

9. An information handling system comprising a processor having access to memory media storing instructions executable by the processor to perform operations, comprising:
identifying, for each register of a plurality of registers, a respective power limit indicated by the register;
determining, of the power limits of the respective registers, a lowest power limit;
determining an instantaneous power use of the computing component;
determining a power-based utilization of the computing component based on i) the instantaneous power use of the computing component and ii) the lowest power limit indicated by the registers;
identifying i) an instantaneous temperature of the computing component, ii) a temperature limit of the computing component, and iii) an ambient temperature of an environment of the computing component;
determining a temperature-based utilization of the computing component based on i) the instantaneous temperature of the computing component, ii) the temperature limit of the computing component, and iii) the ambient temperature of an environment of the computing component;
determining the utilization of the computing component based on a greater of the power-based utilization of the computing component and the temperature-based utilization of the computing component; and
in response to determining the utilization of the computing component, adjusting execution of one or more computer-implemented actions performed at the computing component.

10. The information handling system of claim 9, the operations further comprising:
comparing the instantaneous power of the computing component with the lowest power limit indicated by the registers; and
determining, based on the comparing, that the instantaneous power of the computing component is greater than the lowest power limit indicated by the registers, and in response, assigning a value of the lowest power limit indicated by the registers as the instantaneous power of the computing component.

11. The information handling system of claim 9, the operations further comprising:
comparing the instantaneous power of the computing component with the lowest power limit indicated by the registers; and
determining, based on the comparing, that the instantaneous power of the computing component is less than the lowest power limit indicated by the registers, and in response, determining the power-based utilization of the computing component based on i) the instantaneous power use of the computing component and ii) the lowest power limit indicated by the registers.

12. The information handling system of claim 9, wherein determining the power-based utilization of the computing component further comprises:
determining a ratio of the instantaneous power use of the computing component to the lowest power limit indicated by the registers; and determining the power-based utilization of the computing component as the ratio of the instantaneous power use of the computing component to the lowest power limit indicated by the registers.

13. The information handling system of claim 9, wherein the plurality of registers include a model-specific register, a memory-mapped input/output (MMIO) register, and a platform environment control interface (PECI) register.

14. The information handling system of claim 9, wherein the temperature-based utilization of the computing component is further based on a user-provided value, wherein determining the temperature-based utilization of the computing component further comprises:
    determining a first difference between the instantaneous temperature of the computing component and the ambient temperature of the environment of the computing component;
    determining a second difference between the temperature limit of the computing component and the user-provided value;
    determining a third difference between the second difference and the ambient temperature of the environment of the computing component;
    determining a ratio of the first difference and the third difference; and
    determining the temperature-based utilization of the computing component as the ratio.

15. The information handling system of claim 9, wherein adjusting execution of one or more computer-implemented actions performed at the computing component includes providing a notification indicating to cease execution of one or more computer-implemented applications.

16. The information handling system of claim 9, wherein adjusting execution of one or more computer-implemented actions performed at the computing component includes adjusting a fan speed of a fan that cools the computing component.

17. A non-transitory computer-readable medium storing software comprising instructions executable by one or more computers which, upon such execution, cause the one or more computers to perform operations comprising:
    identifying, for each register of a plurality of registers, a respective power limit indicated by the register;
    determining, of the power limits of the respective registers, a lowest power limit;
    determining an instantaneous power use of the computing component;
    determining a power-based utilization of the computing component based on i) the instantaneous power use of the computing component and ii) the lowest power limit indicated by the registers;
    identifying i) an instantaneous temperature of the computing component, ii) a temperature limit of the computing component, and iii) an ambient temperature of an environment of the computing component;
    determining a temperature-based utilization of the computing component based on i) the instantaneous temperature of the computing component, ii) the temperature limit of the computing component, and iii) the ambient temperature of an environment of the computing component;
    determining the utilization of the computing component based on a greater of the power-based utilization of the computing component and the temperature-based utilization of the computing component; and
    in response to determining the utilization of the computing component, adjusting execution of one or more computer-implemented actions performed at the computing component.

18. The computer-readable medium of claim 17, the operations further comprising:
    comparing the instantaneous power of the computing component with the lowest power limit indicated by the registers; and
    determining, based on the comparing, that the instantaneous power of the computing component is greater than the lowest power limit indicated by the registers, and in response, assigning a value of the lowest power limit indicated by the registers as the instantaneous power of the computing component.

19. The computer-readable medium of claim 17, the operations further comprising:
    comparing the instantaneous power of the computing component with the lowest power limit indicated by the registers; and
    determining, based on the comparing, that the instantaneous power of the computing component is less than the lowest power limit indicated by the registers, and in response, determining the power-based utilization of the computing component based on i) the instantaneous power use of the computing component and ii) the lowest power limit indicated by the registers.

20. The computer-readable medium of claim 17, wherein determining the power-based utilization of the computing component further comprises:
    determining a ratio of the instantaneous power use of the computing component to the lowest power limit indicated by the registers; and
    determining the power-based utilization of the computing component as the ratio of the instantaneous power use of the computing component to the lowest power limit indicated by the registers.

* * * * *